(12) United States Patent
Pritchard et al.

(10) Patent No.: US 10,378,642 B2
(45) Date of Patent: Aug. 13, 2019

(54) PASSIVE LUBRICATION SYSTEM FOR CONCENTRIC GEAR DRIVE FOR AN ELECTRIC VEHICLE

(71) Applicant: BorgWarner Inc., Auburn Hills, MI (US)

(72) Inventors: Larry A. Pritchard, Macomb, MI (US); Philip J. Francis, Lapeer, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/823,668

(22) Filed: Nov. 28, 2017

(65) Prior Publication Data

US 2018/0156326 A1   Jun. 7, 2018

Related U.S. Application Data

(60) Provisional application No. 62/428,916, filed on Dec. 1, 2016.

(51) Int. Cl.
*F16H 57/04* (2010.01)

(52) U.S. Cl.
CPC ..... *F16H 57/0431* (2013.01); *F16H 57/0483* (2013.01)

(58) Field of Classification Search
None
See application file for complete search history.

(56) References Cited

U.S. PATENT DOCUMENTS

| | | | | |
|---|---|---|---|---|
| 2,053,929 | A * | 9/1936 | Wiedmaier | F16H 3/64 184/11.1 |
| 2,182,889 | A * | 12/1939 | Carlson | F16H 57/0483 184/11.1 |
| 3,887,037 | A * | 6/1975 | Haluda | F16H 57/0421 184/6.12 |
| 8,475,314 | B2 * | 7/2013 | Corless | F16H 57/0483 184/6.12 |
| 9,410,610 | B1 * | 8/2016 | Pritchard | F16H 57/045 |
| 9,566,857 | B1 * | 2/2017 | Pritchard | B60K 6/50 |
| 2014/0265658 | A1 * | 9/2014 | Sten | H02K 9/19 310/54 |
| 2017/0343100 | A1 * | 11/2017 | Kawarazaki | F16H 57/0426 |
| 2018/0149261 | A1 * | 5/2018 | Creech | F16H 57/0435 |

* cited by examiner

*Primary Examiner* — Justin Holmes
(74) *Attorney, Agent, or Firm* — Miller, Matthias & Hull LLP (57) ABSTRACT

A passive lubrication system, for a gear drive system of a drive system, for powering an electric vehicle, includes an oil network, an oil sump region, an oil paddle, and an oil diverter. The oil network is defined by and disposed within, at least, a fixed annular region of the gear drive system and a planetary gear system. The oil sump region is configured to provide oil for distribution about the oil network. The oil paddle is operatively coupled with the planetary gear system, configured to rotate with a component of the planetary gear system, and during rotation, configured to course oil, from the oil sump region. The oil diverter is positioned concentric with the oil paddle and radially outward of the oil paddle and configured to receive oil from an oil source, upon rotation of the oil paddle, and direct the received oil to the oil network.

13 Claims, 5 Drawing Sheets

FIG. 5

PASSIVE LUBRICATION SYSTEM FOR CONCENTRIC GEAR DRIVE FOR AN ELECTRIC VEHICLE

CROSS-REFERENCE TO RELATED APPLICATION

This is a non-provisional application claiming priority under 35 U.S.C. § 119(e) to U.S. Provisional Patent Application No. 62/428,916 filed on Dec. 1, 2016

TECHNICAL FIELD

The present disclosure generally relates to gear drive components for use with an electric or hybrid-electric vehicle and, more particularly, to oil distribution systems associated with such gear drive components.

BACKGROUND

Automobiles, among other motor vehicles, have traditionally employed internal combustion engines, which may utilize mechanical and/or hydraulic transmission systems. In more recent times, hybrid-electric motor vehicles have been made available, which utilize a combination of an internal combustion engine and an electric motor. Further, now, fully electric motor vehicles are available, which utilize electric motors as a replacement for internal combustion engines. In such fully electric and/or hybrid electric vehicles, the electric motors may be mounted perpendicular to axels of the motor vehicles, for driving the axels, and thusly, propelling the vehicle. Alternatively, in some example fully and/or hybrid electric vehicles, electric motors may be provided that are mounted transversely, with respect to the axis, meaning that the motor is mounted parallel to, or coaxially disposed with respect to, one or more axels.

Fully electric vehicles, powered by the aforementioned electric motors, often require a gear reduction system (transmission), which may include a complex gear assembly. Such a gear assembly may be utilized to achieve the desired output speed to each wheel of the vehicle. In such gear reduction systems, as with any transmission system or similar mechanical component, it is greatly important that oil is distributed to components for lubrication during operation. In prior systems for providing oil to components of gear reduction systems, electric pumps and/or other power consuming mechanisms are conventionally utilized to distribute oil to the components that require lubrication (e.g, bearings, shafts, seals, and the like).

However, such electric pumps and/or power consuming mechanisms for distributing oil consume a significant amount of power resources, from batteries or other electric power sources, utilized by such vehicles. Accordingly, systems and apparatus for distributing oil to gear reduction systems for electric vehicles, which distribute oil without the need for electric pumps and/or power consuming mechanisms, are desired.

SUMMARY

In accordance with one aspect of the disclosure, a passive lubrication system, for a gear drive system of a drive system, for powering one or more wheels of an electric vehicle, is disclosed. The gear drive system may include a planetary gear system operatively connected to a motor of the drive system. The passive lubrication system may include an oil network, an oil sump region, an oil paddle, and an oil diverter. The oil network may be defined by and disposed within, at least, a fixed annular region of the gear drive system and the planetary gear system. The oil network may be configured to distribute oil to the planetary gear system. The oil sump region may be configured to provide oil for distribution about the oil network. The oil paddle may be operatively coupled with the planetary gear system, configured to rotate with a component of the planetary gear system, and during rotation, configured to course oil, from the oil sump region. The oil diverter may be positioned, at least partially, concentric with the oil paddle and radially outward of the oil paddle. The oil paddle may be configured to receive oil from an oil source, upon rotation of the oil paddle, and direct the received oil to the oil network.

In accordance with another aspect of the disclosure, a drive system for powering one or more wheels of an electric vehicle is disclosed. The drive system includes an electric motor, a two stage planetary gear system, an oil network, an oil sump, an oil paddle, and an oil diverter. The electric motor may include a rotor and a wound stator disposed circumferentially around the rotor. The two stage planetary gear system may include a first planetary gear set operatively connected to the motor, a fixed annular region disposed between the electric motor and the first planetary gear set, and a second planetary gear set operatively connected to the first planetary gear set. The oil network may be defined by and disposed within, at least, a fixed annular region of the gear drive system and the two stage planetary gear system. The oil network may be configured to distribute oil to the two stage planetary gear system. The oil sump region may be configured to provide oil for distribution about the oil network. The oil paddle may be operatively coupled with the planetary gear system, configured to rotate with a component of the planetary gear system, and during rotation, configured to course oil, from the oil sump region. The oil diverter may be positioned, at least partially, concentric with the oil paddle and radially outward of the oil paddle. The oil paddle may be configured to receive oil from an oil source, upon rotation of the oil paddle, and direct the received oil to the oil network.

In accordance with yet another aspect of the disclosure, a planetary gear system for an electric drive system, for powering one or more wheels of an electric vehicle, including a motor, is disclosed. The planetary gear system may include a first planetary gear set operatively connected to the motor and including, at least, a sun gear. The planetary gear set may further include a fixed annular region disposed between the electric motor and the first planetary gear set and a second planetary gear set operatively connected to the first planetary gear set. The planetary gear set may include may include an oil network, an oil sump region, an oil paddle, and an oil diverter. The oil network may be defined by and disposed within, at least, a fixed annular region of the gear drive system and the planetary gear system. The oil network may be configured to distribute oil to the planetary gear system. The oil network may include one or more feed holes, defined by the fixed annular region and disposed proximate to a dead end of the oil diverter, configured to receive oil from the oil diverter. The oil network may further include an annular cavity defined by the fixed annular region, wherein the feed holes direct oil into the annular cavity. The oil network may further include one or more oil channels, each configured to receive oil from the annular cavity and provide oil flow to the first planetary gear set and the second planetary gear set. The oil sump region may be configured to provide oil for distribution about the oil network. The oil paddle may be operatively coupled with the first planetary gear set, configured to rotate with the sun gear of the first planetary gear set, and during rotation, configured to course oil, from the oil sump region. The oil diverter may be positioned, at least partially, concentric with the oil paddle and radially outward of the oil paddle. The oil paddle may be configured to receive oil from an oil source, upon rotation of the oil paddle, and direct the received oil to the oil network. The oil diverter may define a spiraled network circumferentially outward of oil paddle, the spiraled network configured to direct the received oil to the oil network These and other aspects and features of the present disclosure will be better understood when read in conjunction with the accompanying drawings.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION

Figure 1:
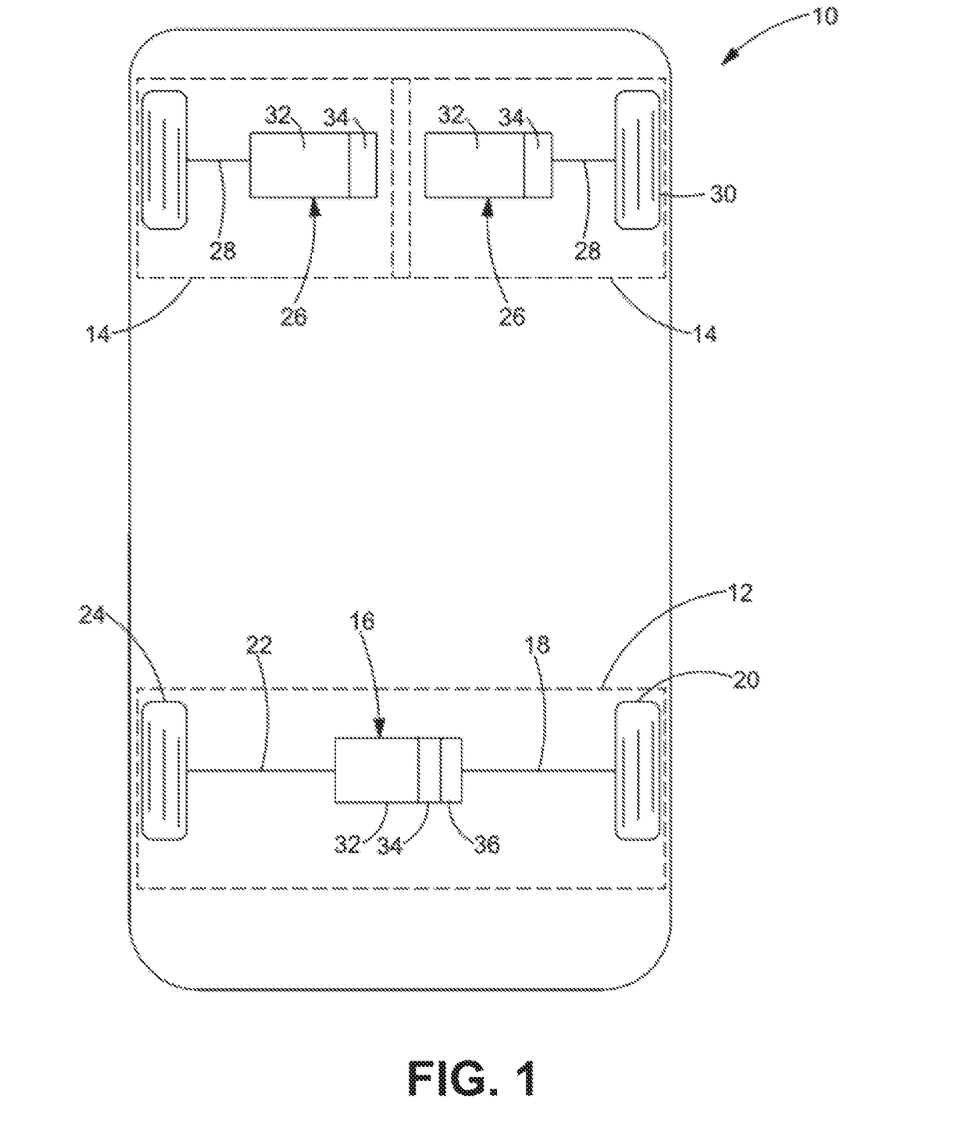
FIG. 1 is a schematic diagram of an electrically powered vehicle, including a front drive system and two rear wheel drive systems, in accordance with an embodiment of the disclosure.

Referring now to the drawings and with specific reference to FIG. 1, a schematic depiction of an electrically powered vehicle 10 is illustrated. The electrically powered vehicle 10 may include a front wheel drive assembly 12 and, optionally, two rear wheel drive assemblies 14. Alternatively, in some examples, the rear wheel drive assemblies 14 may be replaced with a single drive assembly, similar to that of the front wheel drive assembly 12. Accordingly, the electrically powered vehicle 10 is not limited to the present configuration and may include any number of wheels and/or associated wheel drive assemblies. Further, any lubrication systems or apparatus disclosed above may also be applicable for lubricating the rear wheel drive assemblies 14.

The front wheel drive assembly 12 may include a first drive system 16, a right hand side axel 18, connected to a right hand side wheel 20, and a left hand side axel 22, connected to a left hand side wheel 24. As will be explained in more detail below, with reference to FIG. 2, the drive system 16 may include an electric motor 32, a planetary gear system 34 (e.g., a two stage planetary gear system), and a differential 36. Further, in some examples, wherein the rear wheel drive assemblies 14 are included, each rear wheel drive assembly 14 may include a rear drive system 26, a rear axel 28, and a rear wheel 30. Similar to the front wheel drive assembly 12, each rear wheel drive system 14 may include an electric motor 32 and a planetary gear system 34.

Figure 2:
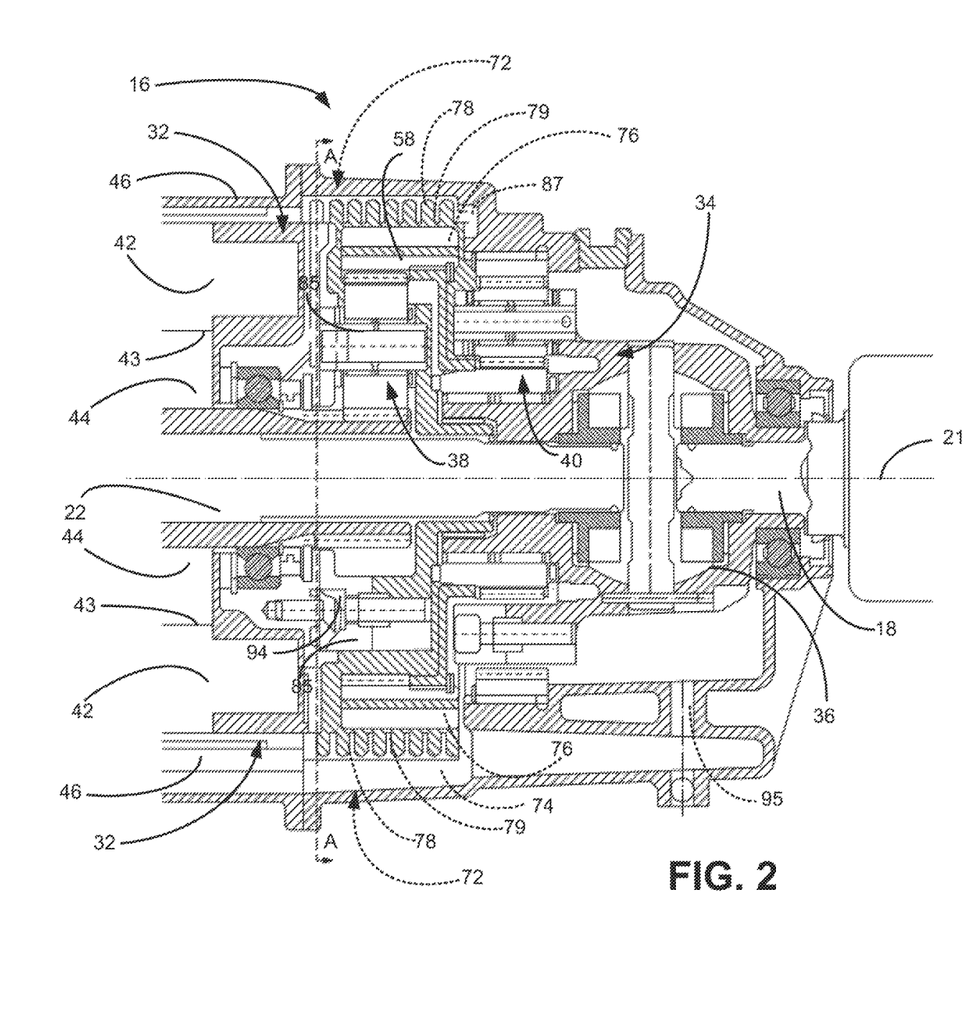
FIG. 2 is a transverse, cross-sectional view of a planetary gear system of the electrically powered vehicle of FIG. 1, including a passive lubrication system, in accordance with FIG. 1 and the present disclosure.

An exemplary, cross-sectional view of the planetary gear system 34 is illustrated, in the context of the drive system 16, in FIG. 2. As shown, the drive system 16 includes, or is otherwise operatively coupled with, the right hand side axel 18 and the left hand side axel 22, each extending from a differential 36. The first drive system 16 may be used, for example, to power a set of wheels, such as, but not limited to, a set of front wheels 20, 24, as shown operatively connected to the first drive system 16 in FIG. 1. Accordingly, the first drive system 16 can be used to power the wheels of the electrically powered vehicle 10 or any other fully electric or hybrid electric vehicle.

As illustrated, the first drive system 16 may be transversely mounted with respect to an axial center line 21 of one or both of the right hand side axel 18 and the left hand side axel 22, meaning that the electric motor 32 is mounted parallel to or coaxially disposed with respect to one or both of the right hand side axel 18 and the left hand side axel 22. As discussed above, the first drive system 16 may include the electric motor 32, which may include a wound stator 42 disposed circumferentially around a rotor 44. The wound stator 42 may include an interior surface 43 (e.g., interior meaning the surface faces the axial center line 21) that defines a substantially cylindrical interior space. The motor 32 may further include a housing 46, which surrounds the wound stator 42 and, in turn, the rotor 44. The rotor 44 rotates within the wound stator 42, which is stationary and may connect to the housing 46 by one or more support members (not shown).

To provide power from the motor 32 to rotate both the right hand side axel 18 and the left hand side axel 22, the differential 36 may be operably mounted to both the right hand side axel 18 and the left hand side axel 22 on opposing ends of the differential 36. The differential may be any known differential in the art, such as, but not limited to, a bevel gear differential.

Figure 3:
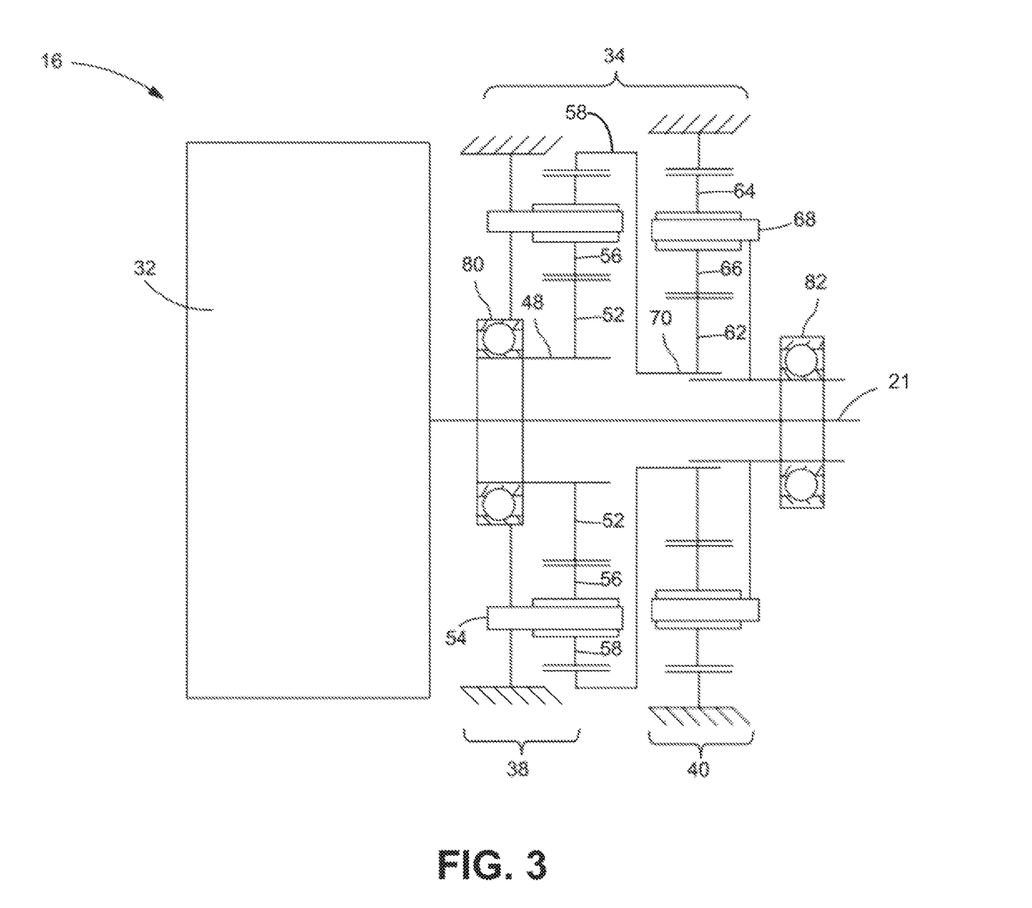
FIG. 3 is a schematic diagram of planetary gear system, in accordance with FIGS. 1-2 and the present disclosure.

The planetary gear system 34, which may be a two stage concentric planetary gear drive system, as shown, may include a first planetary gear set 38, which may be a fixed carrier planetary gear set, and a second planetary gear set 40, which may be a fixed ring planetary gear set. Solely for exemplary purposes, a schematic diagram of the drive system 16 is illustrated in FIG. 3, and discussed below, to describe the functions of the planetary gear system 34 and exemplary components. However, the planetary gear system 34 is certainly not limited to the exemplary, schematically depicted configuration, illustrated in FIG. 3 and discussed below.

As depicted in FIG. 3, the motor 32 may drive an output axel 48, such as a rotor shaft, which may be stabilized by bearings 80, 82. In conjunction, the first planetary gear set 38 and the second planetary gear set 40 may be sized to achieve a desired, overall speed reduction of the output from the motor 32.

The first planetary gear set 38 may include, but is not limited to including, an input first sun gear 52, a fixed carrier 54, which is stationary, a set of first planet gears 56, and an output first ring gear 58. The input sun gear 52 may be mounted directly on the output axel 48 or on an axel that is operably connected to the output axel 48 (e.g., the left hand side axel 22). The first planet gears 56 may be mounted within and supported by the fixed carrier 54. Accordingly, the first planet gears 56 may mesh with both the input sun gear 52 and the output first ring gear 58. The first planet gears 56 may be disposed coaxially within the output first ring gear 58, which may be operably connected to an input second sun gear 62 of the second planetary gear set 40. The first sun gear 52 and the first ring gear 58 may rotate about a first axis, which is parallel to the axial center line 21. Each of the planet gears 56 may rotate about its own planet axis, which may also be parallel to the axial center line 21.

The second planetary gear set 40 may be located outboard (e.g., away from the motor 32) of the first planetary gear set 38 and may include an input second sun gear 62, a fixed second ring gear 64, which is stationary, second planet gears 66, and an output second planet carrier 68. The input second sun gear 62 may be mounted on a second input axel 70 and may receive power from the output first ring gear 58. The second planet gears 66 may mesh with the second sun gear 62 and also with the second ring gear 64. Further, the second planet gears 66 may be disposed coaxially within the second ring gear 64 and may provide output to the wheels 20, 24. The second sun gear 62 and second ring gear 64 may rotate about a second axis, which may be parallel to the axial center line 21, while each of the second planet gears 66 rotate about its own planet axis and also revolve around the second sun gear 62. This revolutionary movement of the second planet gears 66 causes the second planet carrier 68 to rotate, providing output to the wheels.

In some examples, the first planetary gear set 38 and the second planetary gear set 40 may be concentric, meaning that they are oriented about the same axis, which may be, for example, the axial center line 21.

As discussed above, the first drive system 16 and its associated components, especially the planetary gear system 34, include many rotating components, gears, bearings, seals, among other components, which require lubrication during use of the first drive system 16. While many known electric drives employ lubrication systems utilizing electrical pumps or other powered components for providing lubricating oil to such components, the disclosed drive systems aim to omit such electrical pumps or powered elements and, rather, employ passive lubrication techniques. By utilizing passive lubrication techniques, power may not need to be used for lubrication, which may lead to greater efficiency from the drive systems, disclosed herein.

Figure 4:
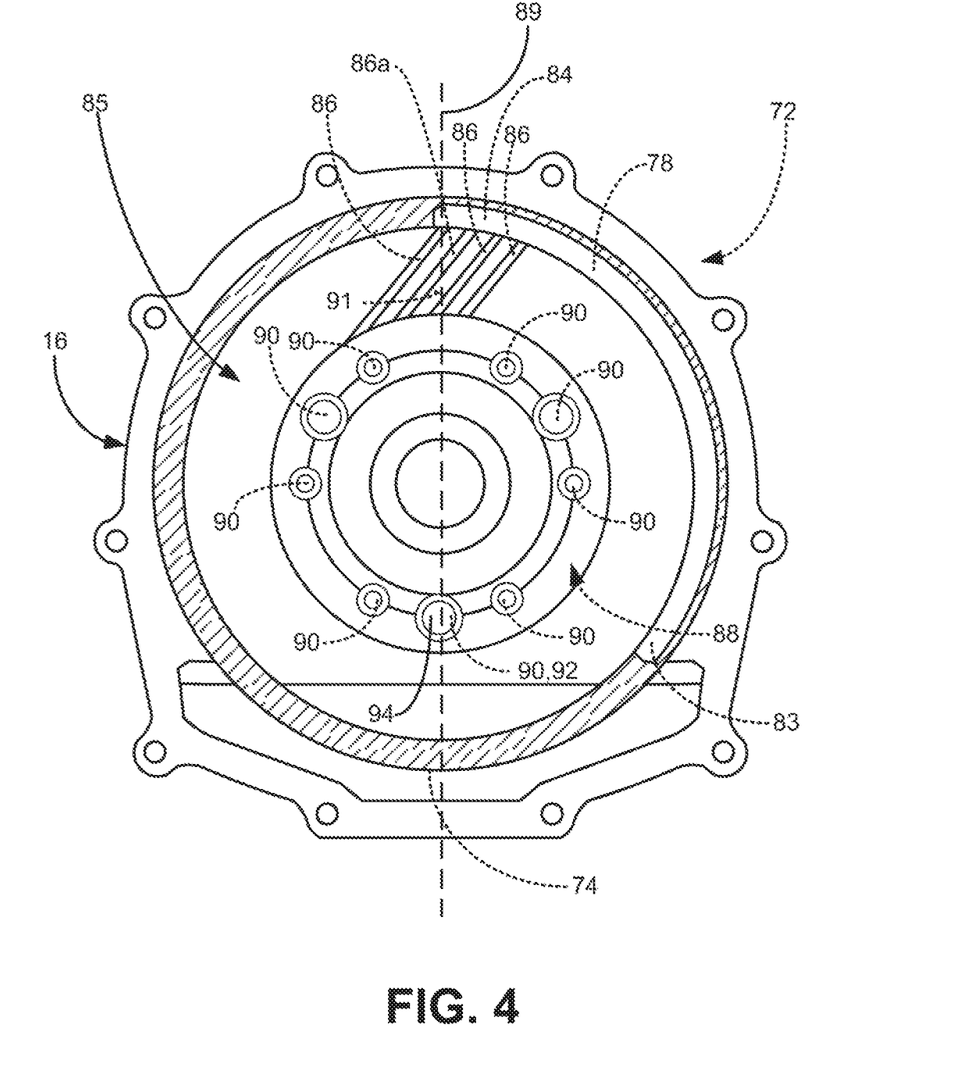
FIG. 4 is a radial, cross-sectional view of the drive system of FIG. 2, illustrating elements of the passive lubrication system, the cross-sectional view taken about the line A-A, shown in FIG. 2, in accordance with FIGS. 1-4 and the present disclosure.
Figure 5:
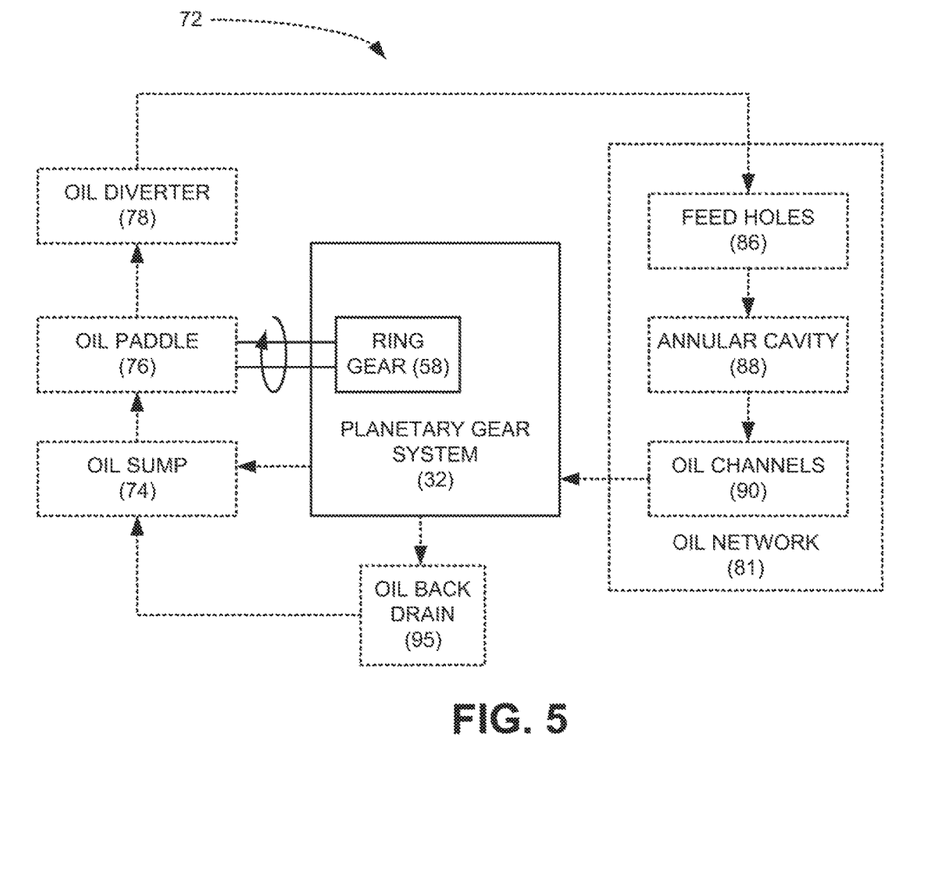
FIG. 5 is a schematic diagram for a passive lubrication system of FIGS. 1, 2, and 4, in accordance with FIGS. 1-4 and the present disclosure.

To that end, as illustrated in FIG. 2, the radial, cross-sectional view of the first drive system 16, taken from the line A-A in FIG. 2, illustrated in FIG. 4, and as illustrated schematically in FIG. 5, the planetary gear system 34 and/or the drive system 16, itself, may include a lubrication system 72, which is a passive lubrication system. "Passive" lubrication systems, as defined herein, refer to lubrication systems which do not require any electrical pumps or other powered components to feed lubrication to components of the planetary gear system 34; rather, passive lubrication systems utilize the mechanical motion performed during operations of the drive system 16 to distribute oil, via the placement of simple mechanical devices and/or defined bores and/or channels within components of the drive system 16 and/or the planetary gear system 34. Elements of the lubrication system 72 are denoted, in FIGS. 2, 4, and 5 by call-out lines having a dotted line pattern and, in the schematic of FIG. 5, the boxes that are exemplary of components of the lubrication system 72 are also depicted having a dotted line pattern.

Distribution of lubricating oil, via the lubrication system 72, begins at the oil sump region 74, which may be a basin or reservoir for oil that is to be utilized by the lubrication system 72 to provide such oil to other elements of the lubrication system 72 (e.g., the oil network 81, as discussed below). Oil may be coursed from the oil sump region 74 to other elements of the lubrication system 72 by utilizing an oil paddle 76 of the lubrication system 72, as best shown in FIG. 2. The oil paddle 76 may be any mechanism operatively coupled with the planetary gear system 34 that is configured to rotate with at least one component of the planetary gear system 34 and, during rotation, is configured to course oil, from the sump region 74, to other elements of the lubrication system 72. The oil paddle 76, during rotation of the planetary gear system 34, may move or "paddle" oil out of the sump region 74 and into other elements of the lubrication system 72 (e.g., an oil diverter 78, as described in more detail below).

As shown in FIG. 2, in some examples, the oil paddle 76 may be operatively coupled with the first planetary gear set 38, as it is depicted as protruding radially outward from the first planetary gear set 38. More specifically, in some examples, the oil paddle 76 may be operatively coupled with the output first ring gear 58 of the first planetary gear set 38, which then causes the oil paddle 76 to rotate with the output first ring gear 58 upon mechanical input from the motor 32. In some such examples, the oil paddle 76 may not be an additional element operatively coupled with the output first ring gear but, rather, the oil paddle 76 may be defined by the ring gear 58, itself (e.g., teeth of the ring gear 58 move or "paddle" oil from the oil sump region 74 to other elements of the lubrication system 72).

The oil paddle 76 may then course the oil from the oil sump region 74 to the oil diverter 78, which is positioned, at least partially, concentric with the oil paddle 76 and positioned radially outward of the oil paddle 76, as shown in FIG. 2. The oil diverter 78 may be configured to receive oil from the oil sump region 74, via the oil paddle 76, upon rotation of the oil paddle 76, and direct the received oil to other elements of the lubrication system 72 (e.g., the aforementioned oil network 81, which will be discussed in more detail below).

In some examples, as shown in FIG. 2, the oil diverter 78 may define a spiraled network 79, circumferentially outward of the oil paddle 76, wherein the spiraled network 79 is configured to receive oil from the oil paddle 76, at whichever point on the oil diverter 78 the oil is delivered, and direct the oil, via the spiraled network 79, towards other elements of the lubrication system 72 (e.g., the oil network 81). As shown best in FIG. 4, the oil diverter 78 may have a sump end 83, proximate, circumferentially, to the sump region 74 and a dead end 84. The dead end 84 may be the end of the oil diverter 78 at which the oil diverter 78 provides oil, received from the oil paddle 76, to the oil network 81. In some examples, the oil diverter 78 may include an anti-rotation tab 87, which is an axial protrusion, as shown in FIG. 2, from the oil diverter 78. In such examples, the anti-rotation tab 87 engages with another static element of the drive system 16 and/or the planetary gear system 34, to prevent the oil diverter 78 from rotating during operation of the drive system 16 and/or the planetary gear system 34.

As mentioned above, the lubrication system 72 may include an oil network 81, which may be defined by and/or disposed within, at least, a fixed annular region 85 of the drive system 16 and/or the planetary gear system 34. The oil network 81 may be configured to distribute oil to the planetary gear system 34, any components thereof, and/or any other components of the drive system 16. The fixed annular region 85, as best shown in FIG. 4, may be a fixed (static) portion of one or both of the drive system 16 and the planetary gear system 34, with which the planetary gear system 34 is affixed to or otherwise operatively associated therewith. The oil network 81 may include any passageways, bores, through holes, grooves, indentations, slopes, gaps, or any space in which fluid can be communicated, defined and/or disposed within one or both of the fixed annular region 85 and the planetary gear system 34.

To that end, in the exemplary oil network 81 illustrated in, at least, FIG. 4 and the accompanying schematic of FIG. 5. The oil network 81 may include one or more of feed holes 86, an annular cavity 88 of the annular region 85, and/or one or more oil channels 90. The one or more feed holes 86 may be defined by the fixed annular region 85 and disposed proximate to the dead end 84 of the oil diverter 78. The one or more feed holes 86 may receive oil from the oil diverter 78 and feed said oil to other, downstream elements of the oil network 81, to provide the oil to components of the planetary gear system 34. In some examples, at least one of the one or more feed holes 86 may be an angled feed hole 86a. The example feed hole 86a is angled with respect to a radial center line 89; as such, the angular hole 86a has a direction of flow at an angle 91, which is taken with respect to the radial center line 89.

In some examples, the oil network 81 may further include an annular cavity 88 defined by the annular region 85. The annular cavity 88 may receive oil from the feed holes 86 and/or any other element of the oil network 81 and/or the lubrication system 72. In some examples, the annular cavity 88 receives oil and floods the annular cavity 88 with said oil, for use in downstream lubrication of planetary gear system 34 components. Accordingly, the feed holes 86 may specifically direct oil into the annular cavity 88 for downstream distribution of oil to the planetary gear system 34.

Further, for providing oil to downstream components of the planetary gear system 34, the oil network 81 may further include one or more oil channels 90. Each of the one or more oil channels 90 may be any bores, tubing, gaps, or other fluid thoroughfare within the drive system 16 and/or the planetary gear system 34, in which oil from the annular cavity 88 may be communicated to components of the planetary gear system 34. For example, example oil channels 90 may include, but are not limited to including, oil passageways associated with pinions, such as planet pinions, motor bearings, shafts, and/or any other components of the drive system 16 and/or the planetary gear system 34. For example, the oil channels 90 may include a first oil channel 92 associated with a center fed pinion shaft 94, which is associated with the annular cavity 88 of the annular region 85.

The oil may flow throughout the oil channels 90, or any other elements of the oil network 81, to lubricate elements of the planetary gear system 34. In some examples, oil from the oil channels 90 may flow to an oil back drain 95, which may then communicate the oil to either the oil sump region 74 or to another component for redistribution and/or removal of said oil, received by the oil back drain 95.

INDUSTRIAL APPLICABILITY

In general, the present disclosure may find applicability in many industries, for example the automotive industry and, more particularly to drive systems for electric and/or hybrid-electric vehicles. In that regard, the present disclosure generally relates to gear drive components for use with an electric or hybrid-electric vehicle and, more particularly, to oil distribution systems associated with such gear drive components As discussed above, by utilizing the rotational motion of the drive system 16 and the planetary gear system 34, itself, the lubrication system 72 need not utilize any additional electrical or mechanical energy to perform the tasks of the lubrication system 72, other than that of normal operations of the drive system 16. Therefore, the aforementioned lubrication system 72, and utilization within both the drive system 16 and the planetary gear system 34, may provide for more efficient, power-saving lubrication solutions, in comparison to the prior art. Further, by utilizing fewer electrical components within the drive, the lubrication system 72 may have enhanced robustness and a lessened chance of component failure, in comparison to prior art lubrication systems.

In operation, the lubrication system 72 may be utilized to passively course lubricating oil throughout the planetary gear system 34. To that end, as best shown in FIG. 5, oil communication methods can be performed using the disclosed apparatus, utilizing, at least, the lubrication system 72, as illustrated in the provided schematic block diagram. The oil may begin at the oil sump 74, wherein it is coursed to the oil diverter 78, via rotation of the oil paddle 76. Rotation of the oil paddle 76 is caused by rotation of an element of the planetary gear system 34, such as the first input ring gear 58, as shown. From the oil diverter 78, the oil may be fed to the oil network 81, as discussed in more detail above. Within the oil network 81, the oil may be communicated from the feed holes 86, to the annular cavity 88, and to the oil channels 90, as discussed in more detail above. From the oil channels 90, the oil may be communicated to the planetary gear system 34 and any components thereof, to lubricate the planetary gear system 34 and any components thereof. From the planetary gear system 34, the oil may then be communicated either directly to the oil sump 74 or to the oil back drain 95. The oil back drain 95 may then communicate the oil to either the oil sump region 74 or to another component for redistribution and/or removal of said oil, received by the oil back drain 95.

By communicating oil, thusly, throughout the planetary gear system 32, further electrical pumps or other powered mechanisms are not necessary for lubrication. Therefore, utilizing features of the present disclosure for lubrication may reduce power used by electric drive systems, may simplify design of electric drive systems, and/or may promote greater efficiency in electric drive systems.

It will be appreciated that the present disclosure provides passive lubrication systems, drive systems, and planetary gear systems for electric drives. While only certain embodiments have been set forth, alternatives and modifications will be apparent from the above description to those skilled in the art. These and other alternatives are considered equivalents and within the spirit and scope of this disclosure and the appended claims.

What is claimed is:

1. A passive lubrication system for a planetary gear system of a drive system for powering one or more wheels of an electric vehicle, the planetary gear system operatively connected to a motor of the drive system, the passive lubrication system including:
   an oil network defined by and disposed within, at least, a fixed annular region of the drive system, the oil network configured to distribute oil to the planetary gear system;

an oil sump region situated within the fixed annular region, and configured to provide oil for distribution about the oil network;

an oil paddle extending along an axis, operatively coupled with the planetary gear system, and configured to rotate with a component of the planetary gear system and, during rotation, configured to course oil, from the oil sump region;

an oil diverter positioned, at least partially, concentric with the oil paddle and radially outward of the oil paddle, the oil diverter being configured to receive oil from the oil sump region, upon rotation of the oil paddle, and direct the received oil to the oil network; and wherein the oil diverter defines a spiraled network circumferentially outward of the oil paddle, the spiraled network having an axial dimension substantially equal to an axial dimension of the oil paddle, the oil paddle being radially interposed between the oil diverter and the component, and configured to direct the received oil to the oil network.

2. The passive lubrication system of claim 1, wherein the oil network includes, at least, one or more feed holes, the one or more feed holes defined by the fixed annular region and disposed proximate to a dead end of the oil diverter, the feed holes configured to receive oil from the oil diverter.

3. The passive lubrication system of claim 2, wherein the one or more feed holes are defined as angular holes, as defined in the fixed annular region, the angular holes having a direction of oil flow at an angle, radially, with respect to a radial center line of the drive system.

4. The passive lubrication system of claim 2, wherein the oil network further includes an annular cavity defined by the fixed annular region and wherein the feed holes direct oil, provided by the oil diverter, into the annular cavity, for distribution into the planetary gear system.

5. The passive lubrication system of claim 4, wherein the oil network further includes one or more oil channels, configured to receive oil from the annular cavity and provide oil flow to the planetary gear system and any associated components thereof.

6. The passive lubrication system of claim 5, wherein at least one of the one or more oil channels is an oil channel associated with a center fed pinion shaft associated with the annular cavity of the fixed annular region.

7. The passive lubrication system of claim 1, wherein the oil paddle is operatively associated with a ring gear of the planetary gear system and configured to rotate with the ring gear.

8. The passive lubrication system of claim 7, wherein the oil paddle is defined by the ring gear.

9. A drive system for powering one or more wheels of an electric vehicle, the drive system comprising:
    an electric motor including
        a rotor, and
        a wound stator disposed circumferentially around the rotor;
    a two stage planetary gear system including:
        a first planetary gear set operatively connected to the motor,
        a fixed annular region disposed between the electric motor and the first planetary gear set, and
        a second planetary gear set operatively connected to the first planetary gear set;
    an oil network defined by and disposed, at least, within the fixed annular region and the two stage planetary gear system, the oil network configured to distribute oil to the two stage planetary gear system;
    an oil sump region situated at least within the fixed annular region, and configured to provide oil for distribution about the oil network;
    an oil paddle extending along an axis, operatively coupled with the two stage planetary gear system, configured to rotate with a component of the first planetary gear set and, during rotation, configured to course oil, from the oil sump;
    an oil diverter positioned, at least partially, concentric with the oil paddle and radially outward of the oil paddle, the oil diverter being configured to receive oil from the oil sump region, upon rotation of the oil paddle, and direct the received oil to the oil network; and wherein the oil diverter defines a spiraled network circumferentially outward of the oil paddle, the spiraled network having an axial dimension substantially equal to an axial dimension of the oil paddle, the oil paddle being radially interposed between the oil diverter and the component, and configured to direct the received oil to the oil network.

10. The drive system of claim 9, wherein the oil network includes:
    one or more feed holes, defined by the fixed annular region and disposed proximate to a dead end of the oil diverter, the feed holes configured to receive oil from the oil diverter,
    an annular cavity defined by the fixed annular region, the feed holes directing oil, provided by the oil diverter, into the annular cavity, and
    one or more oil channels, configured to receive oil from the annular cavity and provide oil flow to the two stage planetary gear system.

11. The drive system of claim 9, wherein the component of the first planetary gear set, with which the oil paddle is operatively associated, is a ring gear of the first planetary gear set.

12. The drive system of claim 11, wherein the oil paddle is defined by the ring gear of the first planetary gear set.

13. A planetary gear system for an electric drive system, powering one or more wheels of an electric vehicle and including a motor, the planetary gear system comprising:
    a first planetary gear set operatively connected to the motor and including, at least, a ring gear;
    a fixed annular region disposed between the electric motor and the first planetary gear set;
    a second planetary gear set operatively connected to the first planetary gear set;
    an oil network defined by and disposed, at least, within the fixed annular region, the oil network configured to distribute oil to the two stage planetary gear system, the oil network including:
        one or more feed holes, defined by the fixed annular region and disposed proximate to a dead end of the oil diverter, the feed holes configured to receive oil from the oil diverter,
        an annular cavity defined by the fixed annular region, the feed holes directing oil into the annular cavity, and
        one or more oil channels, configured to receive oil from the annular cavity and provide oil flow to the first planetary gear set and the second planetary gear set;
    an oil sump region configured to provide oil for distribution about the oil network;
    an oil paddle operatively coupled with the first planetary gear set, configured to rotate with the ring gear of the second planetary gear set and, during rotation, configured to course oil, from the oil sump; and an oil diverter positioned, at least partially, concentric with the oil paddle and radially outward of the oil paddle, the oil diverter being configured to receive oil from the oil sump region, upon rotation of the oil paddle, the oil diverter defining a spiraled network circumferentially outward of oil paddle, the spiraled network configured to direct the received oil to the oil network.

* * * * *